(12) United States Patent
Sun

(10) Patent No.: US 7,128,891 B1
(45) Date of Patent: Oct. 31, 2006

(54) PROCESS OF MAKING METAL CONTAINING IRON OXIDE AND IRON SULFIDE BASED NANOPARTICLE MATERIALS

(75) Inventor: Shouheng Sun, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/210,997

(22) Filed: Aug. 24, 2005

Related U.S. Application Data

(62) Division of application No. 10/124,078, filed on Apr. 17, 2002, now Pat. No. 6,962,685.

(51) Int. Cl.
*C01G 49/00* (2006.01)
*C01G 49/02* (2006.01)

(52) U.S. Cl. .................. 423/511; 423/561.1; 106/456; 106/459

(58) Field of Classification Search ...................... None
See application file for complete search history.

(56) References Cited

U.S. PATENT DOCUMENTS

| | | | |
|---|---|---|---|
| 3,215,572 | A | 11/1965 | Papell |
| 3,252,758 | A | 5/1966 | Abeck et al. |
| 3,648,269 | A | 3/1972 | Rosenweig et al. |
| 3,917,538 | A | 11/1975 | Rosenweig |
| 3,972,595 | A | 8/1976 | Romankiw et al. |
| 4,019,994 | A | 4/1977 | Kelley |
| 4,209,412 | A | 6/1980 | Marcot |
| 4,855,079 | A | 8/1989 | Wyman |
| 4,991,191 | A | 2/1991 | Suryanarayanan |
| 5,648,170 | A | 7/1997 | Okano et al. |
| 5,650,113 | A | 7/1997 | Gregory et al. |
| 5,948,321 | A | 9/1999 | Hong et al. |
| 6,048,515 | A | 4/2000 | Kresse et al. |
| 6,083,476 | A | 7/2000 | Mochizuki et al. |
| 6,086,780 | A | 7/2000 | Hong |
| 6,103,437 | A | 8/2000 | Kozawa et al. |
| 6,123,920 | A | 9/2000 | Gunther et al. |
| 6,165,440 | A | 12/2000 | Esenaliev |

(Continued)

OTHER PUBLICATIONS

K. Raj et al., "Commercial Applications of Ferrofluids", Journal of Magnesium and Magnetic Materials, vol. 85, 1990, pp. 233-245.

(Continued)

*Primary Examiner*—C. Melissa Koslow
(74) *Attorney, Agent, or Firm*—Gibb I.P. Law Firm, LLC; Wan Yee Cheung, Esq.

(57) ABSTRACT

A method and structure for making magnetite nanoparticle materials by mixing iron salt with alcohol, carboxylic acid and amine in an organic solvent and heating the mixture to 200–360 C is described. The size of the particles can be controlled either by changing the iron salt to acid/amine ratio or by coating small nanoparticles with more iron oxide. Magnetite nanoparticles in the size ranging from 2 nm to 20 nm with a narrow size distribution are obtained with the invention. The invention can be readily extended to other iron oxide based nanoparticle materials, including $MFe_2O_4$ (M=Co, Ni, Cu, Zn, Cr, Ti, Ba, Mg) nanomaterials, and iron oxide coated nanoparticle materials. The invention also leads to the synthesis of iron sulfide based nanoparticle materials by replacing alcohol with thiol in the reaction mixture. The magnetite nanoparticles can be oxidized to $\gamma\text{-}Fe_2O_3$, or $\alpha\text{-}Fe_2O_3$, or can be reduced to bcc-Fe nanoparticles, while iron oxide based materials can be used to make binary iron based metallic nanoparticles, such as CoFe, NiFe, and FeCoSmx nanoparticles.

7 Claims, 7 Drawing Sheets

U.S. PATENT DOCUMENTS

| | | | |
|---|---|---|---|
| 6,167,313 | A | 12/2000 | Gray et al. |
| 6,203,777 | B1 | 3/2001 | Schroder |
| 6,207,134 | B1 | 3/2001 | Fahlvik et al. |
| 6,582,922 | B1 | 6/2003 | Daimon et al. |
| 6,682,713 | B1 * | 1/2004 | Funakoshi et al. ......... 423/511 |
| 6,962,685 | B1 * | 11/2005 | Sun ............................ 423/632 |

OTHER PUBLICATIONS

G. Gong et al., "Magnetoresistance and Magnetic Properties of Epitaxial MagnetiteThin Films", Physical Review B, vol. 56, No. 9, 1997, pp. 5096-5099.

Coey et al., Magnetoresistance of Magnetite, Applied Physics Letters, vol. 72, No. 6. 1998, pp. 734-736.

Li et al., "Transport and Magnetic Properties of Epitaxial and Polycrystalline Magnetite Thin Films", Journal of Applied Physics, vol. 83, No. 11, 1998, pp. 7049-7051.

T. Kiyomura et al., "Electrical Properties of MgO Insulating Layers in Spin-Dependent Tunneling Junctions Using Fe3O4", Journal of Applied Physics, vol. 88, No. 8, 2000, pp. 4768-4771.

Moore et al., "Room-Temperature Single-Electron Tunnelling In Surfactant Stabilised Iron Oxide Nanoparticles", Physica E, vol. 9, 2001, pp. 253-261.

Soeya et al., "Development of Half-Metallic Ultrathin Fe3O4 Films For Spin-Transport Devices", Applied Physics Letters, vol. 80, No. 5, 2002, pp. 823-825.

Kim et al., "Characterization and MRI Study of Surfactant-Coated Superparamagnetic Nanoparticles Administered Into the Rat Brain", Journal of Magnetism and Magnetic Materials, vol. 225, 2001, pp. 256-261.

Jordan et al., "Magnetic Fluid Hyperthermia (MFH): Cancer Treatment With AC Magnetic Field Induced Excitation of Biocompatible Superparamagnetic Nanoparticles", Journal of Magnetism and Magnetic Materials, vol. 201, 1999, pp. 413-419.

Kang et al., "Synthesis and Characterization of Nanometer-Size Fe3O4 and y-Fe2O3 Particles", Chem. Materials, vol. 8, 1996, pp. 2209-2211.

Hong et al., "Ordered Structures in Fe3O4 Kerosene-Based Ferrofluids", Journal of Applied Physics, vol. 81, No. 8, 15, 1997, pp. 4275-4277.

Fried et al., "Ordered Two-Dimensional Arrays of Ferrite Nanoparticles", Adanced Materials, vol. 13, No. 15, 2001, pp. 1158-1161.

R. Vijayakumar et al., "Sonochemical Synthesis and Characterization of Pure Nanometer-Sized Fe3O4 Particles", Materials Science and Engineering, vol. A286, 2000, pp. 101-105.

Biddlecombe et al., "Preparation of Magnetic Nanoparticles and Their Assemblies Using a New Fe(II) Alkoxide Precursor", Journal of Materials Chemistry Communication, vol. 11, 2001, pp. 2937-2939.

* cited by examiner

PROCESS OF MAKING METAL CONTAINING IRON OXIDE AND IRON SULFIDE BASED NANOPARTICLE MATERIALS

CROSS-REFERENCE TO RELATED APPLICATIONS

This application is a division of U.S. application Ser. No. 10/124,078 filed Apr. 17, 2002, which is now U.S. Pat. No. 6,962,685.

BACKGROUND OF THE INVENTION

1. Field of the Invention

The present invention generally relates to nanoparticle synthesis, and more particularly to size controlled synthesis of iron-based nanoparticles, especially iron oxide, iron sulfide nanoparticle materials that can have many important technological applications.

2. Description of the Related Art

Magnetite, $Fe_3O_4$, is one of the three common iron oxides, FeO, $Fe_2O_3$ and $Fe_3O_4$, which have found many important technological applications. Magnetic iron oxide nanoparticle dispersions, commercially known as $_cFerrofluid_C$, have been used widely in, for example, rotary shaft sealing for vacuum vessels, oscillation damping for various electronic instruments, and position sensing for avionics, robotics, machine tool, and automotive [K. Raj, R. Moskowitz, *J. Magn. Mag Mater.*, 85, 233 (1990).]. The magnetite is a semimetallic material. Its dark colored particle dispersion has been used in printing applications as high quality toners or inks [U.S. Pat. No. 4,991,191, U.S. Pat. No. 5,648,170, and U.S. Pat. No. 6,083,476, incorporated herein by reference]. Magnetite dispersion is also useful for the manufacture of liquid crystal devices, including color displays, monochromatic light switches, and tunable wavelength filter [U.S. Pat. No. 3,648,269, U.S. Pat. No. 3,972,595, and U.S. Pat. No. 5,948,321, U.S. Pat. No. 6,086,780, and U.S. Pat. No. 6,103,437, incorporated herein by reference]. As a semiconducting ferrimagnet with high Curie temperature (858 K), the magnetite has shown great potential in tunneling device fabrication. [G. Gong, et al, Phys. Rev. B, 56, 5096(1997). J. M. D. Coey, et al, Appl. Phys. Lett., 72, 734(1998). X. Li, et al, J. Appl. Phys., 83, 7049(1998). T. Kiyomura, et al, J. Appl. Phys., 88, 4768(2000). R. G. C. Moore, et al, Physica E, 9, 253(2001). S. Soeya, et al, Appl. Phys. Lett., 80, 823(2002).] The use of magnetite nanoparticles in clinical medicine is an important field in diagnostic medicine and drug delivery. Magnetite nanoparticles, with size of 10–20 nm, are superparamagnetic. These particles interfere with an external homogeneous magnetic field and can be positioned magnetically in a living body, facilitating magnetic resonance imaging (MRI) for medical diagnosis [U.S. Pat. No. 6,123,920, U.S. Pat. No. 6,048,515, U.S. Pat. No. 6,203,777, U.S. Pat. No. 6,207,134, incorporated herein by reference, D. K. Kim, et al, J. Magn. Mag. Mater., 225, 256(2001)], and AC magnetic field induced excitation for cancer therapy [U.S. Pat. No. 6,165,440, U.S. Pat. No. 6,167,313, incorporated herein by reference, A. Jordan, et al, J. Magn. Mag. Mater., 201, 413(1999)].

All of these medicinal and technological applications of magnetic iron oxide fluids require that the magnetic particle size is within the single domain size range and the overall particle size distribution is narrow so that the particles have uniform physical properties, biodistribution, bioelimination and contrast effects. For example, for medicinal applications, mean particle sizes should generally be in the range 2 to 15 nm and, for use as blood pool agents, the mean overall particle size including any coating materials should preferably be below 30 nm. However, producing particles with the desired size, acceptable size distribution without particle aggregation has constantly been a problem.

Two general methods for producing magnetite ferrofluid have been used in the prior art. In the first method, the magnetic fluid was prepared by grinding of magnetite in a ball mill for a long time with a surfactant and carrier solvent, as exemplified in U.S. Pat. No. 3,215,572, and U.S. Pat. No. 3,917,538, incorporated herein by reference. In the second approach, stable dispersion of magnetite fluid was obtained by transferring co-precipitated magnetite covered with an oleate monolayer into a non-polar solvent. The main characteristics of this method are to obtain an ultrafine magnetic oxide by a chemical reaction from the aqueous solution containing ferrous ($Fe^{2+}$) and ferric ($Fe^{3+}$) ions, and to accomplish strong adsorption of surfactants on the magnetic particles in a water solution, as exemplified in U.S. Pat. No. 4,019,994, U.S. Pat. No. 4,855,079, U.S. Pat. No. 6,086,780, incorporated by reference, and other publications [Y. S. Kang, et al., Chem. Mater. 8, 2209(1996). C.-Y. Hong, et al, J. Appl. Phys. 81, 4275(1997). T. Fried, et al, Adv. Mater. 13, 1158(2001).]. This method does not need a long preparation time like the grinding method and is suitable for mass production of magnetic fluid. But, it does need constant adjustments on pH value of the solution to ensure the particle formation and stabilization. Recently, a third sonochemical synthesis of $Fe_3O_4$ from Fe(II) salt was reported [R. Vijayakumar, et al, Materials Sci. Eng. A286, 101(2000). G. B. Biddlecombe, et al., J. Mater. Chem., 11, 2 937(2001).]. The major disadvantage of all these techniques is heterogeneity in the size distribution of the resulting magnetic particles, the composition of these particles, and/or the interaction forces between the particles. The process towards smaller magnetite nanocrystals has very limited success.

SUMMARY OF THE INVENTION

The present invention presents an approach that makes magnetite nanoparticle materials by mixing iron salt with alcohol, carboxylic acid and amine in an organic solvent and heating the mixture to 200°–360° C. The size of the particles can be controlled either by changing the iron salt to acid/amine ratio or by coating small nanoparticles with more iron oxide. Magnetite nanoparticles in the size ranging from 2 nm to 20 nm with a narrow size distribution are obtained with the invention. The invention can be readily extended to other iron oxide based nanoparticle materials, including $Fe_2O_4$ (M=Mn, V, Co, Ni, Cu, Zn, Cr, Ti, Ba, Mg, or rare earth metal) nanomaterials, and iron oxide coated nanoparticle materials. The invention also leads to the synthesis of iron sulfide based nanoparticle materials by replacing alcohol with thiol in the reaction mixture. The magnetite nanoparticles can be oxidized to $\gamma\text{-}Fe_2O_3$, or $\alpha\text{-}Fe_2O_3$, or can be reduced to bcc-Fe nanoparticles, while iron oxide based materials can be used to make binary iron based metallic nanoparticles, such as CoFe, NiFe, and nanoparticles.

An object of the present invention is to provide a method for synthesizing $Fe_3O_4$ nanoparticle materials, with controlled particle sizes. A second object of the invention is to make other types of iron oxide nanoparticle materials, such as $MFe_2O_4$, $RFeO_3$, nanoparticle materials. A third object of the invention is to make iron oxide coated nanoparticle materials. A fourth object of the invention is to make iron sulfide and iron sulfide coated nanoparticle materials, and another object of the invention is to make metallic nanomaterials.

To make $Fe_3O_4$ with the invention, iron salt is mixed in solvent with alkyl alcohol, an acid, and primary amine. The mixture is heated at a temperature in the range of 200° C. to 360° C. After cooling, the magnetite nanoparticles are precipitated out from their dispersion and redispersed into the solvent. The size the particles is controlled by adjusting either the iron to acid/amine ratio or the reaction temperature. Large sized particles can also be obtained by adding small $Fe_3O_4$ nanoparticles to the mixture and heating to reflux. Adding a different metal salt to the mixture will lead to $MFe_2O_4$ nanomaterials, while adding a different type of nanoparticle to the mixture will yield iron oxide coated core-shell particle materials. By replacing alcohol with thiol in the mixture, both iron sulfide nanomaterials and iron sulfide coated core-shell nanomaterials can be made. Passing oxygen through the $Fe_3O_4$ materials will result in either $\gamma$-$Fe_2O_3$ or $\alpha$-$Fe_2O_3$, depending on the reaction temperature applied, while passing hydrogen-containing gas through the $Fe_3O_4$ particles will lead to bcc-Fe nanoparticle materials.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 5A is a low resolution image of a 2D nanocrystal assembly; FIG. 5B is a low resolution image of a 3D superlattice nanocrystal assembly, and FIG. 5C is a high resolution atomic lattice image of several nanocrystals;

FIG. 7A is from 4 nm $Fe_3O_4$ and 7B is from 8 nm $Fe_3O_4$;

DETAILED DESCRIPTION OF PREFERRED EMBODIMENTS OF THE INVENTION

Figure 1:
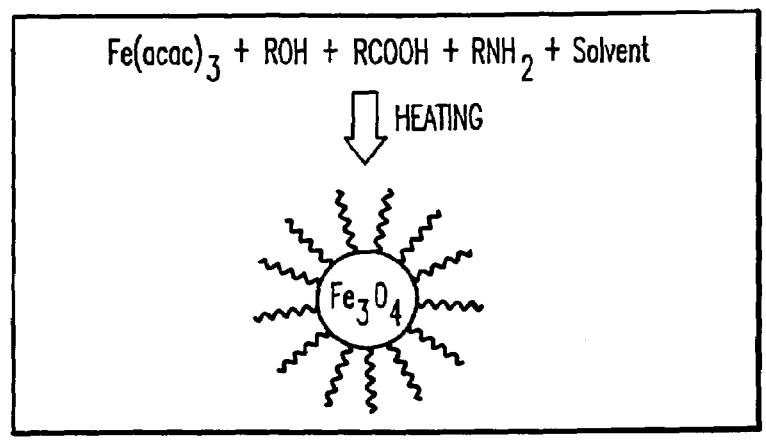
FIG. 1 is a schematic that shows a generalized scheme for the preparation of $Fe_3O_4$ nanoparticles via iron salt reduction/decomposition.
Figure 2:
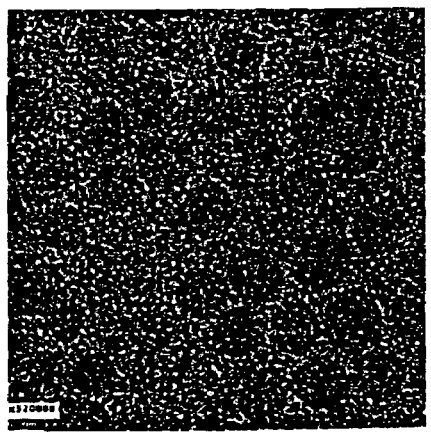
FIG. 2 shows a TEM image of 6 nm $Fe_3O_4$ particles prepared from the Scheme shown in FIG. 1.
Figure 3:
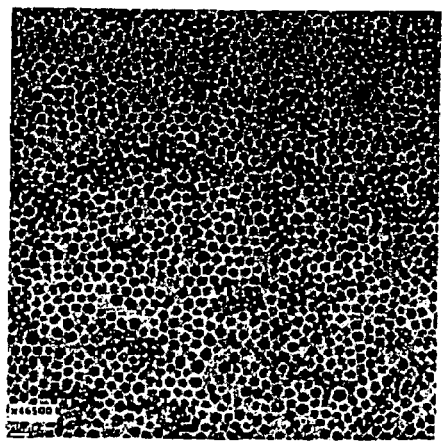
FIG. 3 shows a TEM image of 8 nm $Fe_3O_4$ nanoparticles prepared according to the scheme shown in FIG. 1 via coating 6 nm $Fe_3O_4$ nanoparticles with more iron oxide.
Figure 4:
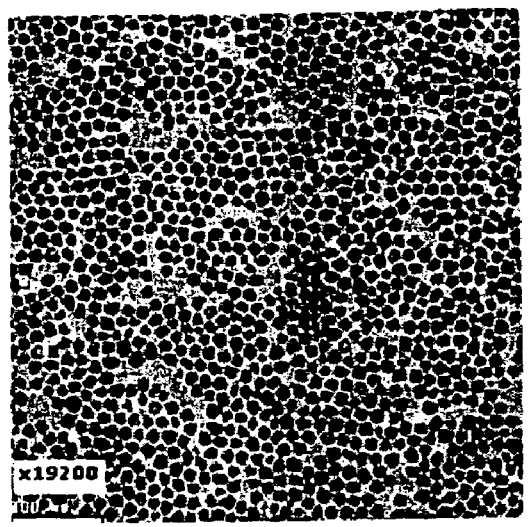
FIG. 4 shows a TEM image of 12 nm $Fe_3O_4$ nanoparticles prepared according to the scheme shown in FIG. 1 via coating 8 nm $Fe_3O_4$ nanoparticles with more iron oxide.

As mentioned above, a first object of the present invention is to provide a method for synthesizing $Fe_3O_4$ nanoparticles, with controlled particle sizes and size distribution. As shown in FIG. 1, iron oxide nanoparticle materials can be made by mixing iron salt, alcohol, carboxylic acid and amine in an ether solvent and heating the mixture to reflux. A black solution is formed. After being cooled to room temperature (e.g., 15° C.–30° C.), the mixture is treated with ethanol and black magnetic materials was precipitated out from the solution. The black product is dissolved in hexane in the presence of acid and amine, and re-precipitated with ethanol. This way, high boiling solvent and other organic impurities can be removed from the nanoparticle product, yielding pure $Fe_3O_4$ nanoparticle materials. The materials can disperse into various solvents to give a black-brown solution. TEM analysis shows that particles are nearly monodisperse. Using this procedure by varying the stabilizer/iron ratio, or increasing reaction temperature, the magnetite nanoparticles with sizes ranging from 2 nm to 12 nm can be made. FIG. 2 is a TEM image of 6 nm $Fe_3O_4$ nanocrystals prepared according to FIG. 1 and deposited from their hexane dispersion on an amorphous carbon surface. Such nanocrystals can serve as seeds for large $Fe_3O_4$ nanocrystal formations.

The larger $Fe_3O_4$ nanocrystals can also be made by seed mediated growth. The small $Fe_3O_4$ nanocrystals, the seeds, are mixed with more materials shown in FIG. 1 and heated to reflux. By controlling the amount of small nanocrystal seeds, variously sized $Fe_3O_4$ nanocrystals can be formed. The method leads to $Fe_3O_4$ nanoparticles in the size ranging from 4 nm to 20 nm, depending on the relative weight of small $Fe_3O_4$ and iron salt mixture used. For example, mixing and heating 62 mg of 8 nm $Fe_3O_4$ nanoparticles with 2 mmol of iron salt, 10 mmol alcohol, 2 mmol of carboxylic acid and 2 mmol amine led to 12 nm $Fe_3O_4$ nanoparticles, while mixing and heating 15 mg of 8 nm $Fe_3O_4$ with the same amount of iron salts and other organic precursors led to 16 nm $Fe_3O_4$ nanoparticles.

Figure 5A:
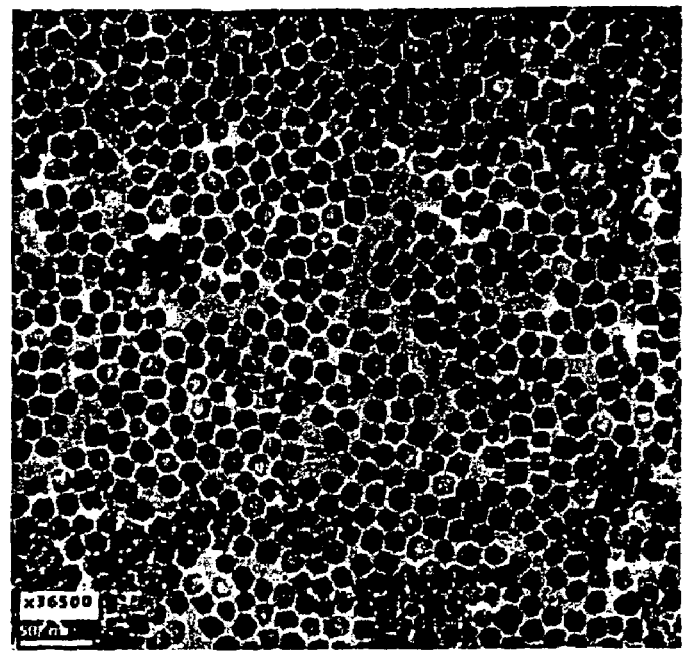
FIGS. 5A–5C show three TEM images of 16 nm $Fe_3O_4$ nanocrystals prepared according to the scheme shown in FIG. 1 via coating 12 nm $Fe_3O_4$ nanoparticles with more iron oxide.
Figure 5B:
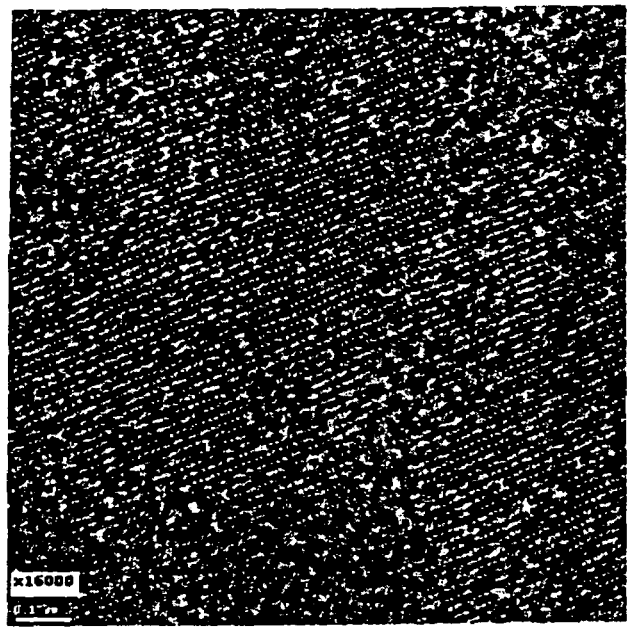
Figure 5C:
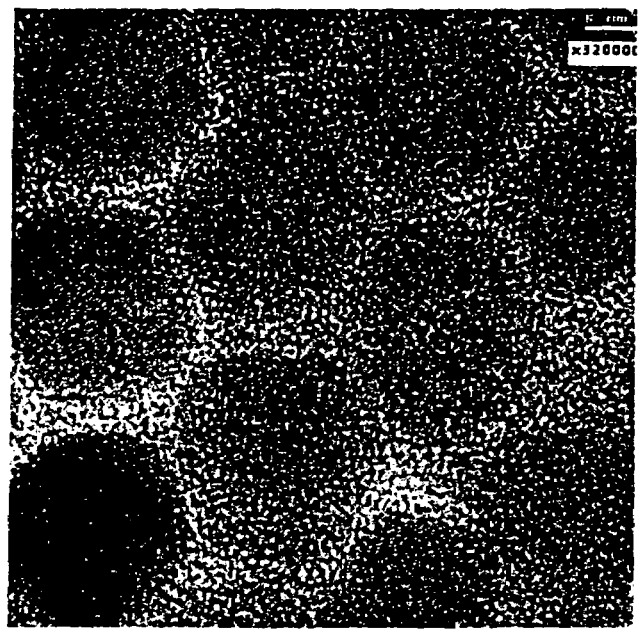
Figure 6:
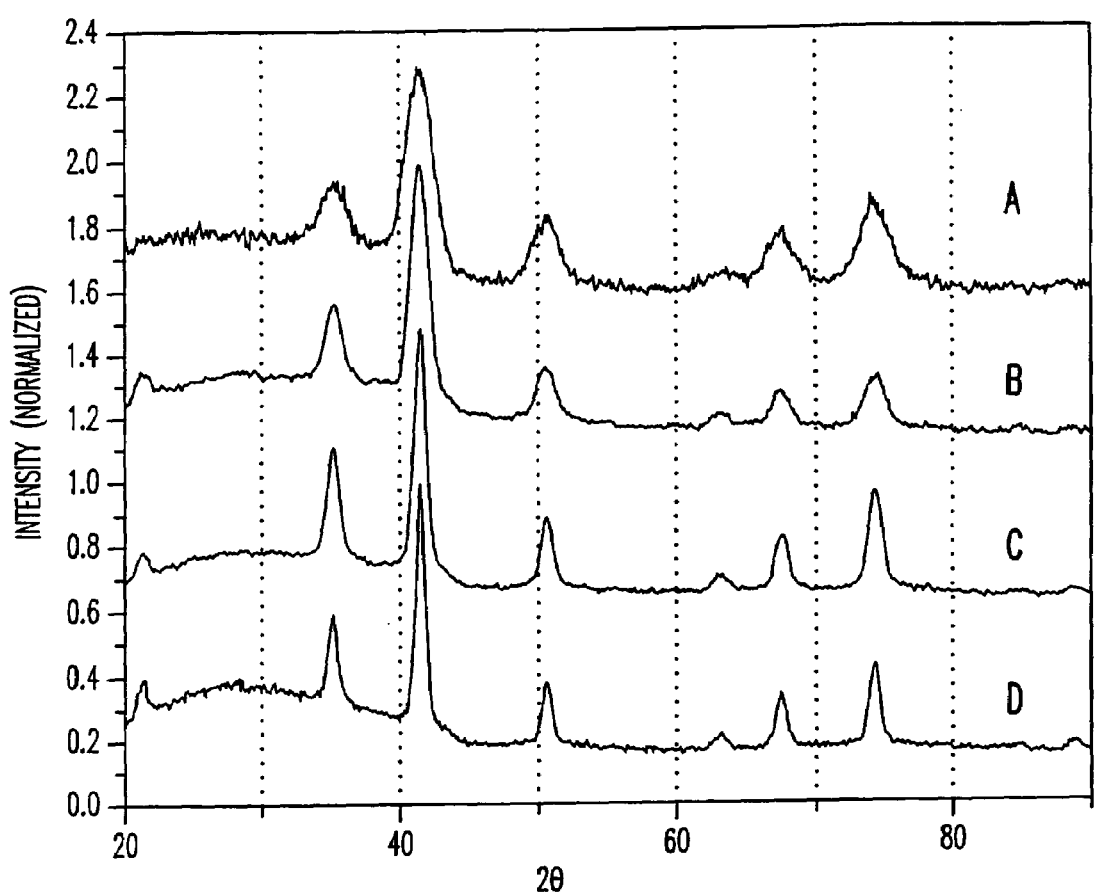
FIG. 6 shows the X-ray diffraction patterns of (A) 4 nm, (B) 8 nm, (C) 12 nm, and (D) 16 nm $Fe_3O_4$ nanocrystal assemblies. The samples were deposited on glass substrate from their hexane dispersions. Diffraction patterns were collected on a Simens D-500 diffractometer under Co K $\alpha$ radiation ($\lambda$=1.788965 A)

FIGS. 3–5C are TEM images of variously sized $Fe_3O_4$ nanocrystals prepared using the seed-mediated growth method. Compared with the magnetite nanocrystals shown in FIG. 2, these images demonstrate that the seed-mediated growth not only yields larger nanocrystals, it also narrows the size distribution of the nanocrystals, leading to more uniform nanocrystal materials and facilitating the formation of nanocrystal superlattices, as shown in FIG. 5B. The high quality of crystal nature of these nanocrystals (fcc spinel structure) is revealed by both high-resolution TEM for a single nanocrystal and X-ray diffractometry for a group of nanocrystals. The atomic lattices corresponding to lattice constant of d(111)=4.86 angstroms are clearly seen in high-resolution TEM image (FIG. 5C). The unit cell parameter from this fcc spinel structure is 8.41 angstroms, which agrees with that of standard $Fe_3O_4$. FIG. 6 shows the X-ray diffraction pattens of variously sized $Fe_3O_4$ nanocrystal assemblies made from FIG. 1 pattern (A) and seed mediated growth patterns (B–D). From x-ray line broading in FIG. 6, the average diameter of the particles can be estimated from Scherrer$_C$s formula:

$$L_{hkl}=K\lambda/\beta \cos \theta$$

in which L is the average crystallite size along the direction of the Miller indices (hkl), $\lambda$ is the wavelength of the x-rays used, K is Scherrer$_C$s constant and has a value of about 0.9.

θ is the Bragg angle, and β is the peak width at half-height in radians. The calculation confirms that the particle dimensions match the average particle size determined by statistical analysis of the TEM images, indicating that each particle is an individual single crystal.

Figure 7A:
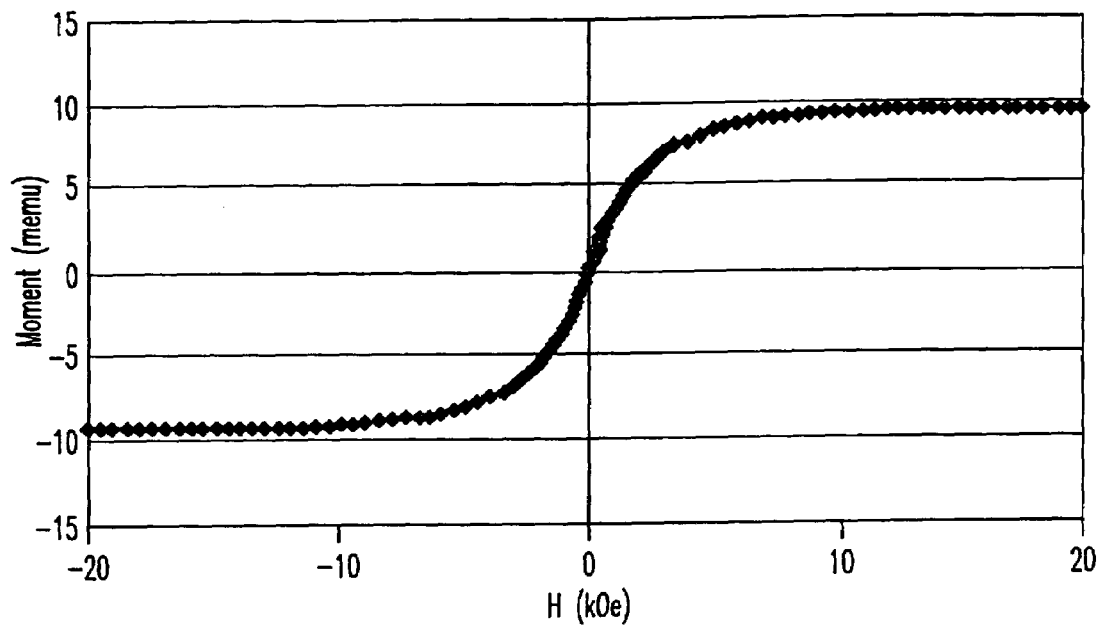
FIGS. 7A and 7B show hsteresis loops of $Fe_3O_4$ nanocrystal materials at room temperature (e.g., 15° C.–30° C.)
Figure 7B:
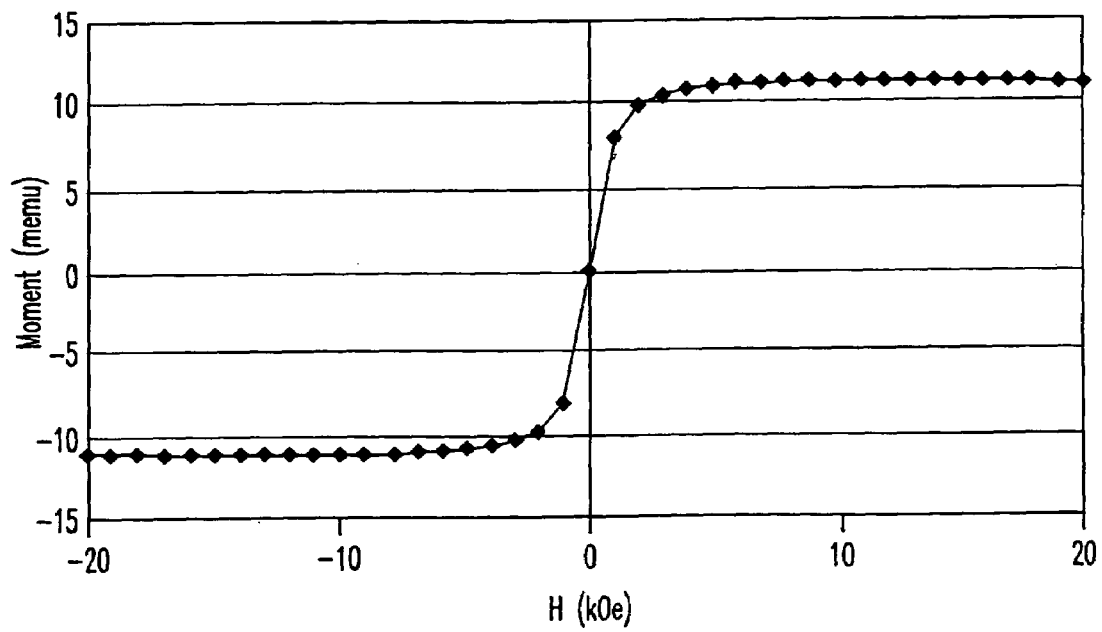

Due to the small size of $Fe_3O_4$ nanocrystals, they are superparamagnetic at room temperature. FIGS. 7A and 7B illustrate hsteresis loops of two different $Fe_3O_4$ nanocrystal materials at room temperature. FIG. 7A is from 4 nm $Fe_3O_4$ nanocrystals, and FIG. 7B is from 8 nm $Fe_3O_4$ nanocrystals. It can be seen that smaller particles (4 nm) need stronger magnetic fields to align them due to the thermal agitation (kT) of the small particles with low magnetic anisotropy energy (KV).

The process shown in FIG. 1 can be readily extended to the synthesis of more complicated nanoparticle materials, such as $MFe_2O_4$ nanoparticle materials. This involves mixing M salt and iron salt in a solvent with alkyl alcohol, an acid, and primary amine and heating the mixture to reflux. Metal salts can be from any of following salts: Zn, Cu, Ni, Co, Mn, Cr, V, Ti, Mg, Ba and rare earth metals. And, iron salt can be any of $Fe(OOCCH_3)_2$, $Fe(acac)_2$, $Fe(acac)_3$, $FeC_2O_4$, $Fe_2(C_2O_4)_3$, wherein acac represents acetylacetonate, or $CH_3COCHCOCH_3$. Some non stoichiometric nanomaterials can also be made in a similar way.

The same process shown in FIG. 1 can also produce iron oxide coated nanoparticle materials. For example, mixing iron salt and FePt nanoparticles with alkyl alcohol, an acid, and primary amine in a solvent and heating the mixture to reflux will give $Fe_3O_4$ coated FePt nanoparticles. The process is rather general and can be applied to other iron oxide coated nanoparticle syntheses, including magnetic Co, Ni, Fe, FePt, etc and non magnetic Au, Ag, Cu, Pt, Pd, etc.

Figure 8:
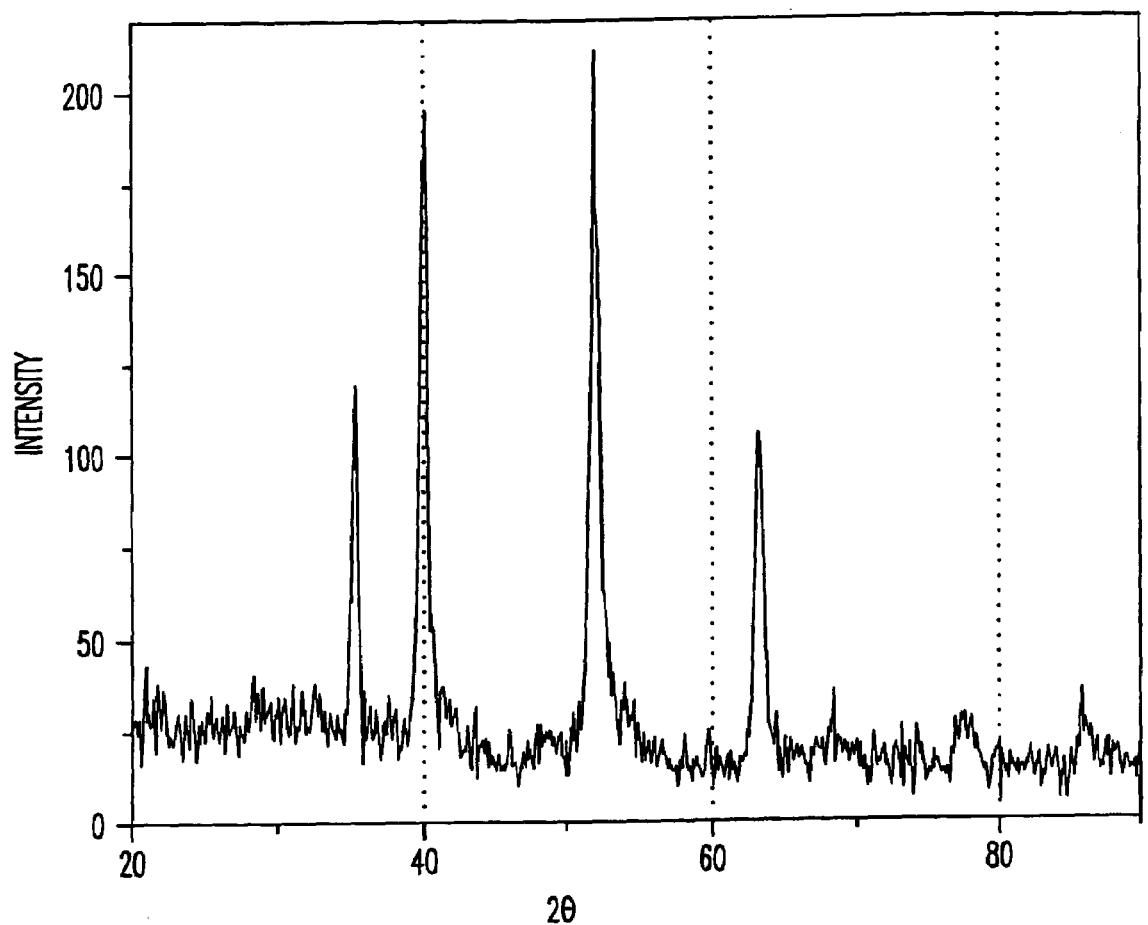
FIG. 8 shows the X-ray diffraction pattern of iron sulfide nanocrystal materials.

Replacing alcohol (ROH) in the $Fe_3O_4$ synthesis with alkane thiol (RSH) leads to iron sulfide nanomaterials. FIG. 8 is the X-ray diffraction pattern of as synthesized iron sulfide nanocrystal materials. It matches with pyrrhotite FeS phase. Similar to the iron oxide coating experiments, iron sulfide coated nanoparticles can also be made by mixing nanoparticles with iron salt, thiol, carboxylic acid, and amine in a solvent and heating to reflux. The core nanoparticles include not only magnetic nanoparticles, but also non-magnetic nanoparticles. The process can be extended to produce other complicated nanomaterials as well, including non stoichemetric $FeMoS_x$, and $CoMoS_x$ nanomaterials.

Figure 9:
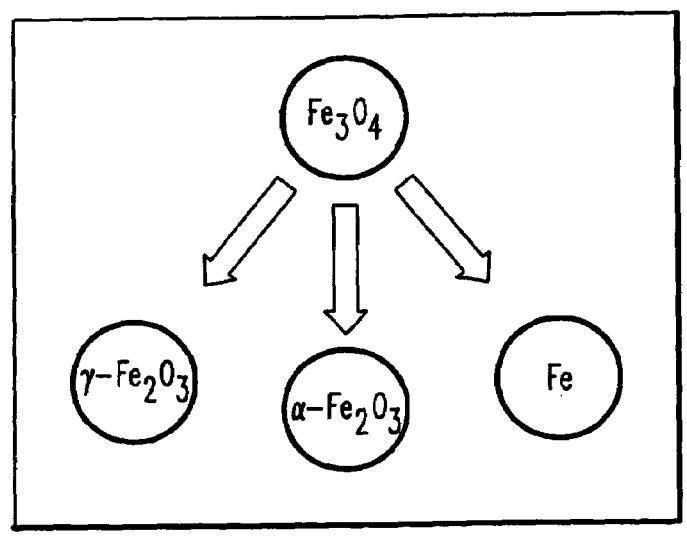
FIG. 9 is a schematic that indicates that, starting with $Fe_3O_4$ nanoparticles, a variety of other iron based nanoparticle materials can be made.
Figure 10:
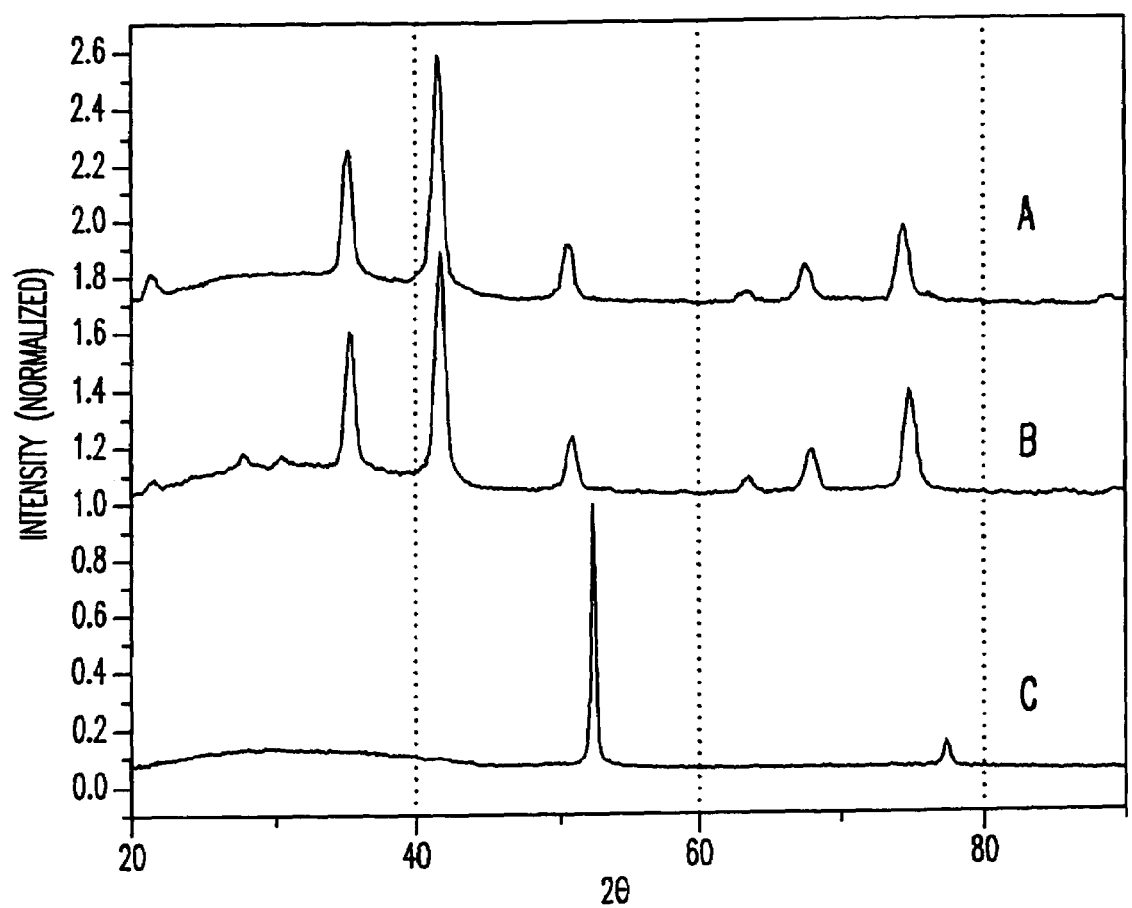
FIG. 10 shows the X-ray diffraction patterns of (A) 16 nm $Fe_3O_4$ nanocrystals and (B) $\gamma$-$Fe_2O_3$ nanocrystals obtained from $O_2$ oxidation of 16 nm $Fe_3O_4$ at 250 C for 2 h, and (C) bcc-Fe nanocrystal assembly from the reduction of $Fe_3O_4$ under Ar+$H_2$(5%) at 400 C for 2 h.

The $Fe_3O_4$ based nanocrystal materials can be used as starting materials for other iron oxide nanocrystal materials and metallic nanocrystal materials. FIG. 9 shows an example of various transformations of $Fe_3O_4$. For example, passing oxygen through $Fe_3O_4$ nanocrystal assembly at 250° C. gives $\gamma$-$Fe_2O_3$ nanocrystal assembly, and at 500° C., yields $\alpha$-$Fe_2O_3$ nanocrystal assembly. Passing reducing gas [Ar+ $H_2$(5%)] through a $Fe_3O_4$ nanocrystal assembly at 400 C leads to bcc-Fe nanocrystal assembly. The transformation is illustrated in FIG. 10, in which line A is from starting $Fe_3O_4$, Line B is from the annealed $Fe_3O_4$ under $O_2$ at 250° C. for 2 h, and Line C is from the annealed $Fe_3O_4$ under Ar+$H_2$ (5%) at 400 C for 2 h. Line B matches with the well-known $\gamma$-$Fe_2O_3$, while Line C relates to typical bcc-Fe. Similarly, other oxide nanomaterials can also be used as starting materials for the synthesis of some metallic nanomaterials, CoFe, or NiFe.

The following shows how the invention is useful with the general synthesis of 4 nm $Fe_3O_4$ nanocrystal materials. Iron (III) acetylacetonate (706 mg, 2 mmol), 1,2-hexa-decanediol (2.58 g, 10 mmol), oleic acid (6 mmol), oleyl amine (6 mmol) and dioctyl ether (20 mL) should be mixed in a glass vessel and heated to reflux for 30 minutes. The heating source should then be removed and the black-brown reaction mixture allowed to cool to room temperature. Ethanol should then be added. The black product should be precipitated and separated by centrifugation. Yellow-brown supernatant should be discarded and the black product dispersed in hexane in the presence of oleic acid and oleyl amine. Any unsolved precipitation should be removed by centrifugation. The $Fe_3O_4$ nanocrystals should be precipitated out by adding ethanol and centrifugation and are easily re-dispersed in an alkane solvent, aromatic solvent, or chlorinated solvent. Variously sized $Fe_3O_4$ up to 12 nm in diameter can be made in a similar way by changing the stabilizer/iron salt ratio or the reaction temperature.

The following shows how the invention is useful with the general synthesis of 16 nm $Fe_3O_4$ nanocrystal materials. Iron (III) acetylacetonate (706 mg, 2 mmol), 1-octadecanol (2.70 g, 10 mmol), oleic acid (2 mmol), oleyl amine (2 mmol), phenyl ether (20 mL), and 8 nm $Fe_3O_4$ nanoparticles (15 mg) dispersed in hexane should be mixed in a glass vessel under nitrogen, stirred and heated to 100° C. to remove hexane. The mixture should be then heated to reflux for 30 minutes. The heating source should be removed and the black-brown reaction mixture cooled to room temperature. Ethanol should be added. The black product should be precipitated and separated by centrifugation. The yellow-brown supernatant should be discarded and the black product dispersed in hexane in the presence of oleic acid and oleyl amine. Any unsolved precipitation should be removed by centrifugation. The $Fe_3O_4$ nanocrystals should be precipitated out by adding ethanol and centrifugation. They can be easily re-dispersed in alkane solvent, aromatic solvent and chlorinated solvent. Such seed mediated growth method can been used to make variously sized $Fe_3O_4$ nanoparticle materials with sizes ranging from 4 nm to 20 nm.

The following shows how the invention us useful with the general synthesis of $CoFe_2O_4$ nanocrystal materials. Iron (III) acetylacetonate (706 mg, 2 mmol), cobalt (II) acetylacetonate (1 mmol), 1-octadecanol (2.70 g, 10 mmol), oleic acid (2 mmol) and oleyl amine (2 mmol) and phenyl ether (20 mL) should be mixed in a glass vessel and heated to reflux for 30 minutes. The heating source should be removed and the black-brown reaction mixture be cooled to room temperature. Ethanol should be added. The black product should be precipitated and separated by centrifugation. The yellow-brown supernatant should be discarded and the black product dispersed in hexane in the presence of oleic acid and oleyl amine. Any unsolved precipitation should be removed by centrifugation. The $CoFe_2O_4$ nanocrystals should be precipitated out by adding ethanol and centrifugation. They can be easily re-dispersed in alkane solvent, aromatic solvent and chlorinated solvent. By changing the cobalt salt to other metal salts (such as one of the following and their derivatives: $Co(OOCCH_3)_2$, $Co(acac)_2$, $Co_3(citrate)_2$, $Ni(OOCCH_3)_2$, $Ni(acac)_2$, $Ni(oxalate)$, $Cu(OOCCH_3)_2$, $Cu(acac)_2$, $Cu(oxalate)$, $Zn(OOCCH_3)_2$, $Zn(acac)_2$, $Zn(oxalate)$, $Mn(OOCCH_3)_2$, $Mn(acac)_2$, $Mg(OOCCH_3)_2$, $Mg(acae)_2$, $Ba(OOCCH_3)_2$, $Ba(acac)_2$, $Sm(OOCCH_3)$, $Sm(acac)_3$, $MoO_2(acac)_2$, $CH_3COCHCOCH_3$, various $MFe_2O_4$ nanocrystal materials can be made, in which M=Mn, V, Co, Ni, Cu, Zn, Cr, Ti, Ba, Mg, or rare earth metal.

The following shows how the invention is useful with the general process for making $Fe_3O_4$ coated FePt nanomaterials. Iron (III) acetylacetonate (706 mg, 2 mmol), 1-octadecanol (2.70 g, 10 mmol), oleic acid (2 mmol), oleyl amine (2 mmol), phenyl ether (20 mL), and 4 m FePt nanoparticles dispersed in hexane should be mixed in a glass vessel under nitrogen, stirred and heated to 100° C. to remove hexane. The mixture should be then heated to reflux for 30 minutes. The heating source should be removed and the black-brown reaction mixture cooled to room temperature. Ethanol should be added. The black product should be precipitated and separated by centrifugation. The yellow-brown supernatant should be discarded and the black product dispersed in hexane in the presence of oleic acid and oleyl amine. Any unsolved precipitation should be removed by centrifugation. The nanocrystals should be precipitated out by adding ethanol and centrifugation. They can be easily re-dispersed in alkane solvent, aromatic solvent and chlorinated solvent. The process can be readily extended to other types of iron oxide coated nanomaterials with core including magnetic (Co, Ni, Fe) and nonmagnetic (Ag, Au, Pd, Pt, Cu, or other polymer based particles) nanoparticles.

The following shows how the invention is useful with the general synthesis of iron sulfide nanocrystal materials. Iron (III) acetylacetonate (706 mg, 2 minol), 1-hexadecane thiol (6 mmol), oleic acid (2 mmol), oleyl amine (2 mmol) and phenyl ether (20 ml) should be mixed and heated to reflux for 30 minutes. The heating source should be removed and the black-brown reaction mixture cooled to room temperature. Ethanol should be added. The black product should be precipitated and separated by centrifugation. The yellow-brown supernatant should be discarded and the black product dispersed in hexane in the presence of oleic acid and oleyl amine. Any unsolved precipitation should be removed by centrifugation. The iron sulfide nanocrystals should be precipitated out by adding ethanol and centrifugation. The process can be used to make other metal sulfides, such as cobalt sulfide, nickel sulfide, etc., as well as metal sulfide coated nanoparticle materials.

The above made iron oxide and iron sulfide based nanoparticle materials could have many important applications in such as ferrofluid, data storage, sensor, medicinal imaging, drug delivery, catalysis, and magnetic and optical devices.

Therefore, as shown above, the present invention presents an approach that makes magnetite nanoparticle materials by mixing iron salt with alcohol, carboxylic acid and amine in an organic solvent and heating the mixture to 200°–360° C. The size of the particles can be controlled either by changing the iron salt to acid/amine ratio or by coating small nanoparticles with more iron oxide. Magnetite nanoparticles in the size ranging from 2 nm to 20 nm with a narrow size distribution are obtained with the invention. The invention can be readily extended to other iron oxide based nanoparticle materials, including $Fe_2O_4$ (M=Mn, V, Co, Ni, Cu, Zn, Cr, Ti, Ba, Mg, or rare earth metal) nanomaterials, and iron oxide coated nanoparticle materials. The invention also leads to the synthesis of iron sulfide based nanoparticle materials by replacing alcohol with thiol in the reaction mixture. The magnetite nanoparticles can be oxidized to $\gamma$-$Fe_2O_3$, or $\alpha$-$Fe_2O_3$, or can be reduced to bcc-Fe nanoparticles, while iron oxide based materials can be used to make binary iron based metallic nanoparticles, such as CoFe, and NiFe nanoparticles.

While the invention has been described in terms of preferred embodiments, those skilled in the art will recognize that the invention can be practiced with modification within the spirit and scope of the context.

What is claimed is:

1. A process of making a metal containing iron oxide based nanoparticle material comprising:

mixing an iron salt with a metal salt, an alcohol, an organic carboxylic acid, and an organic amine in an organic solvent to produce a mixture;

heating said mixture in a reflux temperature range;

cooling said mixture to room temperature;

precipitating a product from said mixture; and dispersing said product in a solvent to produce a nanocrystal dispersion.

2. The process in claim 1, wherein said heating comprises heating said mixture to a temperature between 200°–360° C.

3. The process in claim 1, wherein said metal salt comprises one of the following and their derivatives: $Co(OOCCH_3)_2$, $Co(acac)_2$, $CO_3(citrate)_2$, $Ni(OOCCH_3)_2$, $Ni(acac)_2$, Ni(oxalate), $Cu(OOCCH_3)_2$, $Cu(acac)_2$, Cu(oxalate), $Zn(OOCCH_3)_2$, $Zn(acac)_2$, Zn(oxalate), $Mn(OOCCH_3)_2$, $Mn(acac)_2$, $Mg(OOCCH_3)_2$, $Mg(acae)_2$, $Ba(OOCCH_3)_2$, $Ba(acac)_2$, $Sm(OOCCH_3)$, $Sm(acac)_3$, $MoO_2(acac)_2$, where acac=$CH_3COCHCOCH_3$.

4. The process in claim 1, wherein said nanomaterials comprise of stoichiometric $MFe_2O_4$, in which M=Mn, V, Co, Ni, Cu, Zn, Cr, Ti, Ba, Mg, or rare earth metal.

5. A process of making a metal containing iron sulfide nanoparticle based material comprising:

mixing an iron salt with a metal salt, an alkane thiol, a carboxylic acid, and an organic amine in an organic solvent to produce a mixture;

heating said mixture in a reflux temperature range;

cooling said mixture to room temperature;

precipitating a product from said mixture; and dispersing said product in a solvent.

6. The process in claim 5, wherein said heating comprises heating said mixture to a temperature between 200°–360° C.

7. The process in claim 5, wherein said metal salt comprises one of the following and their derivatives: $MoO_2(acac)_2$, $Mo(OOCCH_3)_2$, $Co(OOCCH_3)_2$, $Co(acac)_2$.

* * * * *